United States Patent
French et al.

[11] 3,867,235
[45] Feb. 18, 1975

[54] OPTICAL VIEWPOINT

[75] Inventors: Hollis E. French, North Chelmsford, Mass.; Stanley C. Herbine, Reading, Pa.; Gerald L. McLeod, Lexington, Mass.

[73] Assignee: Itek Corporation, Lexington, Mass.

[22] Filed: Nov. 2, 1972

[21] Appl. No.: 303,169

Related U.S. Application Data

[63] Continuation-in-part of Ser. No. 724,832, April 29, 1968, abandoned.

[52] U.S. Cl. ............... 161/2, 156/106, 161/156, 161/183, 161/194, 161/195, 161/201, 161/203, 161/406, 351/166, 350/175 R
[51] Int. Cl. ............................................... B44f 1/00
[58] Field of Search ....... 161/2, 156, 183, 194, 195, 161/201, 203, 204, 406; 156/106; 351/166; 350/175 R, 175 NG

[56] References Cited
UNITED STATES PATENTS

| | | | |
|---|---|---|---|
| 3,282,722 | 11/1966 | Hailstone | 156/106 X |
| 3,532,590 | 10/1970 | Briddle | 161/183 |
| 3,549,476 | 12/1970 | Krefeld et al. | 161/183 X |
| 3,622,440 | 11/1971 | Snedeker et al. | 161/203 X |
| 3,657,057 | 4/1972 | Shorr et al. | 162/2 |

*Primary Examiner*—Mayer Weinblatt
*Attorney, Agent, or Firm*—Homer O. Blair; Robert L. Nathans; David E. Brook

[57] ABSTRACT

Optical viewports are disclosed which comprise an optically clear, relatively brittle, layer, such as glass, and an optically clear, flexible, tough polymeric film weakly bonded to the back of the brittle layer. A sharp impact force on the surface of the brittle layer results in fragmentation of that layer and partial delamination of the polymeric film from the surface of the brittle layer. The delamination results in improved dissipation of the impact energy, and the tough polymeric film retains its structural integrity thereby preventing fragments of the brittle layer from being projected rearwardly. Such an optical viewport can be used as an opthalmic safety lens to prevent injuries to the wearers eye upon receipt of an impact force on the lens.

10 Claims, 5 Drawing Figures

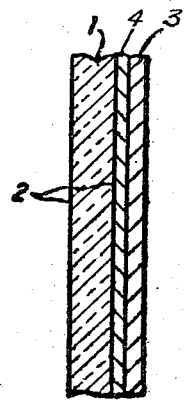
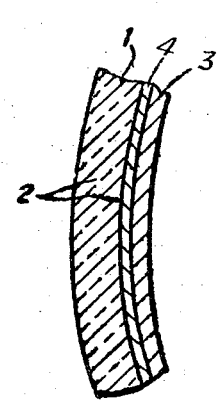
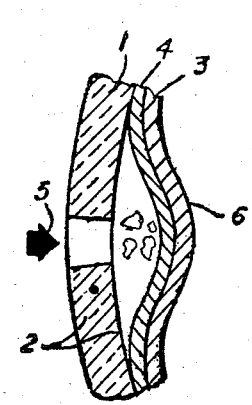
FIG. 1.  FIG. 2.  FIG. 3.
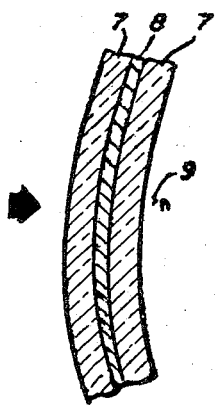
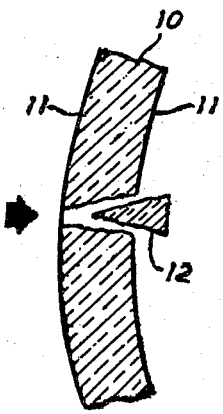
FIG. 4.  FIG. 5.

OPTICAL VIEWPOINT

This is a continuation in part of application Ser. No. 724,832, filed Apr. 29, 1968, now abandoned.

BACKGROUND OF THE INVENTION

1. Field of the Invention

This invention relates to optical viewports and more particularly relates to optical viewports which are specially constructed to withstand impact forces without causing injury.

2. Description of the Prior Art

In the manufacture of safety glass, it has been the practice in the art to firmly secure two layers of glass together by an intermediate layer of synthetic plastic bonding material that is optically transparent and flexible. For example, in U.S. Pat. No. 2,060,140, there is disclosed safety glass comprising two layers of glass bonded together by an intermediate adhesive layer. One of the glass layers is relatively thick and heat hardened on its outer surface. The other glass layer is relatively thin and serves as a protective covering. The intermediate adhesive layer is described as a transparent bonding means of reinforcing, preferably non-brittle materials such as cellulose nitrate, cellulose acetate, polystyrene, polyacrylic acid and esters thereof, etc. In U.S. Pat. No. 2,361,589, there is described safety glass formed from a relatively thick intermediate layer of snythetic plastic having relatively thin layers of glass bonded to its surfaces. Suitable plastics are not listed, but the plastic is intended to be of a relatively hard and tough nature.

In each of the above-noted patents, the principal object is to prevent fragmentation of the glass upon receipt of a sharp impact force and the projection of a mass of glass fragments rearwardly. This object is accomplished. However, where the rear surface of the laminate is glass, a conically shaped splinter can break from the rear glass layer at the point of impact which can be projected rearwardly at a high velocity. If the glass is used as an ophthalmic lens, this splinter may become deeply imbedded in the eye resulting in severe injury, frequently, more severe than an injury caused by a mass of fragments from ordinary glass.

SUMMARY OF THE INVENTION

This invention relates to optical viewports comprising an optically clear, relatively brittle layer, such as glass, and a second layer of an optically clear, flexible, tough polymeric film weakly bonded to the inner surface of the first layer. Preferably, the weak bond is produced by an intermediate bonding material, preferably of a thermoplastic material. When the first brittle layer suffers a sharp impact, such as when struck by a projectile, the weak bond between the layers breaks causing partial delamination of the flexible film from the brittle surface. This results in a substantial dissipation of impact force. The tough polymeric film retains its structural integrity and prevents fragments of the first layer that might form from being projected rearwardly from the surface of the laminate. For this reason, the optical viewports formed according to this invention are especially useful for the formation of opthalmic safety glass.

Optical viewport is used therein, to include but not to be limited to, the following: ophthalmic lenses; both prescription and non-prescription; windshields; optical instrument lenses such as those used in telescopes, binoculars, periscopes, microscopes, firearm sights; etc.

BRIEF DESCRIPTION OF THE DRAWINGS

FIG. 1 is a cross-sectional view of a laminate suitable for the optical viewports of this invention;

FIG. 2 is a cross-sectional view of an ophthalmic safety lens prepared from the laminate of FIG. 1;

FIG. 3 is a cross-sectional view illustrating the effect of a sharp impact on an optical viewport prepared according to this invention; and, FIGS. 4 and 5 are cross-sectional views illustrating the effect of a sharp impact on safety glass of the prior art.

DESCRIPTION OF THE PREFERRED EMBODIMENTS

With reference to FIG. 1, there is shown a laminate suitable for use with the optical viewports formed in accordance with this invention. A first transparent brittle layer, such as glass layer 1, is bonded to a tough, flexible and optically transparent film 3 by an intermediate bonding layer 4 which is preferably a thermoplastic material. The surfaces 2 of glass layer 1 may have been tempered for strength by heat treatments or chemical treatments. Such treatments are well known to those skilled in the art.

The polymeric film bonded to the glass surface should be optically clear and strong. By strong, it is meant that the film should preferably have a film tensile strength of at least about 5,000 p.s.i. and should additionally have a high burst strength to resist penetration by high velocity projectiles. Organic plastics such as cellulose acetate, cellulose triacetate, cellulose acetate butyrate, cellulose propionate, polyesters such as Mylar (the condensation product of ethylene glycol and terephthalic acid), polyvinyl chloride, copolymers of vinylidene chloride--vinyl chloride, polycarbonates, polyphenylene ethers, nylons, etc., are preferred. The most preferred material is polyethylene terephtalate (Mylar) because of its outstanding strength and optical properties.

In general, the thickness of the polymeric film is not critical and will depend, in any event, on the end use for the particular optical viewport being constructed. For ophthalmic safety lenses, it has been found that thicknesses in the range of from about 1 to 10 mils are suitable, with thicknesses of from about 2 to 5 mils being preferred.

As mentioned above, the polymeric film is weakly bonded to the brittle layer. The bond should be weak enough so that partial delamination of the polymeric film occurs upon receipt of a sharp impact force on the glass surface. On the other hand, it must be sufficiently strong to prevent even partial delamination of the film from the glass under normal usage and handling and to prevent total delamination upon receipt of a sharp impact force. The preferred peel strengths are from about 0.1 to about 0.5 pounds per linear inch. As used herein, the peel strength is measured according to ASTM D903–49, "Peel or Stripping Strength of Adhesive Bonds."

The weak bond can be formed by simply laminating the polymeric film to the glass, if possible, but is preferably formed by the use of an intermediate bonding layer. This intermediate bonding layer should also be optically clear and is preferably flexible and thermoplastic. It may form a weak bond with either the brittle layer, e.g. glass, or the flexible film. Preferably, the intermediate bonding material is a synthetic thermoplastic such as, for example, polyvinyl acetate, polyvinyl butyrate, polystyrene, etc.

The thickness of the intermediate bonding layer depends also upon the ultimate use for the optical viewport being constructed. In the case of ophthalmic safety lenses, thicknesses of between about 0.25 and 1 mil have been found to be suitable.

With reference to FIG. 2, there is shown an opthalmic lens formed according to this invention. One method for its fabrication comprises coating the polymeric film 3 with a solution of the intermediate bonding material 4, using solvent coating procedures. The solvent is allowed to evaporate and the coated plastic film is placed in contact with a ground and polished glass ophthalmic lens 1. The composite is then placed in a vacuum chamber and heated, preferably to the activation point of the bonding material, while pressure is simultaneously applied to the flexible film. Thereafter, the safety laminate is allowed to cool and the pressure is removed from the plastic film by releasing the vacuum.

FIG. 3 represents fracture of an ophthalmic lens of this invention resulting from a substantial impact, such as that caused by a small projectile at point 5. Brittle particles, such as glass particle 6, are projected rearward from the point of impact. The striking force causes partial delamination of the weakly bonded flexible film 3 with dissipation of much of the force of impact. The brittle particles 6 projected rearward are retained by the tough flexible film 3. None of the brittle particles 6 pass through the film.

The impact force which can be absorbed by the viewports described herein will vary, of course, with the specific polymeric film bonding layer, and glass layer used. For example, whereas most of the polymeric films mentioned would be capable of stopping a BB, most would not stop a bullet, although the polycarbonates may. The particular combination for a designated end use can be easily chosen by those skilled in the art using no more than routine experimentation.

By way of contrast, FIGS. 4 and 5 represent the result of a projectile striking an ophthalmic safety lens of the prior art. With respect first to FIG. 4, there is shown two glass layers 7 firmly bonded together by an intermediate synthetic plastic layer 8. Upon impact, a conically shaped splinter of glass 9 can be projected rearward from the point of impact at a high velocity. This splinter could result in a serious eye injury. FIG. 5 represents a glass lens 10 having heat or chemically tempered surfaces 11. Upon impact, a glass splinter can similarly be projected rearward at high velocity.

The invention above described is exemplified as follows:

EXAMPLE 1

A polyethylene terephthalate film having a thickness of 3 mils is coated with a 20% solution by weight of polyvinylbutyrate. The solvent is allowed to evaporate resulting in a polyethylene terephthalate film having a coating of polyvinylbutyrate in a thickness of ½ mil. This film is placed over a heat tempered optical lens with the polyvinylbutyrate in contact with the glass surface. The composite is placed in a vacuum chamber and heated to a temperature of 300°F. with pressure being applied to the polyethylene terephthalate film. Temperature is maintained for 1 minute. Thereafter, the composite is allowed to cool, the vacuum is released and the lens removed from the vacuum chamber.

A steel pellet (BB) having a diameter of about ⅛ inch is shot at the lens from an air rifle at a speed of approximately 450 feet per second. Upon impact, the glass fractures resulting in delamination of the plastic film over approximately two thirds of the lens surface. The plastic film retains its structural integrity and prevents penetration by the glass fragments.

EXAMPLE 2

The procedure of Example 1 is repeated substituting a cellulose triacetate film having a thickness of 5 mils for the polyethylene terephthalate film of Example 1. A pellet shot at the glass lens causes fragmentation and delamination of the plastic film from the glass surface over much of the surface area of the lens. No fragments pierce the film.

EXAMPLE 3

The procedure of Example 1 is repeated with the substitution of a polyvinylacetate intermediate bonding layer for the polyvinylbutyrate. Substantially equivalent results are obtained.

EXAMPLE 4

A 3 mil layer of polyurethane is bonded directly to the surface of a glass lens without an intermediate bonding material by curing the plastic between the lens and a mold. After curing, a pellet shot at the lens in the manner of Example 1 causes fragmentation of the assembly with rearward projection of a mass of glass fragments. This illustrates the necessity for using an intermediate bonding material to provide delamination upon impact and absorption of impact energy.

EXAMPLE 5

The procedure of Example 4 is repeated 2 times with the substitution of layers formed from melt coated polycarbonate and an epoxy resin. In both cases, there was fragmentation of the assembly upon impact with a projectile accompanied by projection of glass particle toward the rear.

What is claimed is:

1. An optical viewport consisting essentially of an optically clear, relatively brittle, glass layer which is susceptible to fragmentation upon the receipt of a substantial impact force at its outer surface and an optically clear, flexible, tough polymeric film sufficient to prevent rearward projection of glass fragments upon fragmentation of said brittle layer, said film being bonded to the inner surface of said brittle layer by a bond weak enough to cause partial delamination of the film from the brittle layer when said brittle layer receives an impact force sufficient to cause fragmentation thereof, such delamination helping to dissipate impact force.

2. A viewport of claim 1 wherein the weak bond is formed by an intermediate bonding layer.

3. A viewport of claim 1 wherein said polymeric film is selected from group consisting of a cellulose acetate, cellulose propionate, polyester, polyvinyl chloride or copolymer of polyvinyl chloride with vinylidene chloride, polycarbonate or polyphenylene ether.

4. A viewport of claim 1 wherein the weak bond has a peel strength of less than ¼ pound per linear inch.

5. A viewport of claim 3 wherein said intermediate bonding layer is selected from group consisting of polyvinyl acetate, polyvinyl butyrate or polystyrene.

6. A viewport of claim 4 wherein said polymeric film is selected from group consisting of a cellulose acetate, cellulose propionate, polyester, polyvinyl chloride or a copolymer of polyvinyl chloride with vinylidene chloride, polycarbonate or polyphenylene ether.

7. A viewport of claim 6 wherein said intermediate bonding layer is selected from group consisting of a polyvinyl acetate, polyvinyl butyrate or polystyrene.

8. A viewport of claim 2 wherein said bond has a peel strength below about 0.1 pounds per linear inch.

9. A viewport of claim 8 wherein said plastic film is formed from polyethylene terephthalate.

10. A viewport of claim 9 wherein said bonding layer is polyvinyl acetate.

* * * * *